United States Patent [19]

Nakanishi

[11] Patent Number: 4,950,148

[45] Date of Patent: Aug. 21, 1990

[54] APPARATUS FOR MANUFACTURING SILICONE GEL SHEET

[75] Inventor: Motoyasu Nakanishi, Fujishi, Japan

[73] Assignee: Kabushiki Kaisha Cubic Engineering, Shizuokaken, Japan

[21] Appl. No.: 73,067

[22] Filed: Jul. 13, 1987

[30] Foreign Application Priority Data

Jan. 31, 1987 [JP] Japan .................................. 62-21254

[51] Int. Cl.$^5$ .......................... B29G 3/02; A01J 21/00; B29B 7/00

[52] U.S. Cl. ..................................... 425/224; 425/101; 425/373; 264/240; 264/349

[58] Field of Search ..................... 425/4 C, 91, 92, 96, 425/99, 101, 113, 114, 117, 122, 200, 197, 209, 817 C, 127, 371, 394, 406, 407, 378 R, 377, 373, 89, 116, 115, 220, 223, 224, 325, 354, 366, 270, 281, 283; 156/246, 249, 539, 242, 501, 540, 247, 231, 324; 264/510, 241, 267, 101, 102, 213, 216, 217, 352, 331.12, 240, 349, DIG. 6

[56] References Cited

U.S. PATENT DOCUMENTS

| | | | |
|---|---|---|---|
| 2,698,271 | 12/1954 | Clark | 425/197 |
| 3,137,743 | 6/1964 | Pelley | 425/817 C |
| 3,154,618 | 10/1964 | Baer et al. | 264/349 |
| 3,764,247 | 10/1973 | Garrett | 264/DIG. 6 |
| 3,900,543 | 8/1975 | Davis | 264/DIG. 6 |
| 3,933,548 | 1/1976 | Anderson, Jr.; et al. | 156/246 |
| 4,003,777 | 1/1977 | Eddy | 156/246 |
| 4,128,369 | 12/1978 | Kemerer et al. | 425/394 |
| 4,191,805 | 3/1980 | Nolte | 156/246 |
| 4,393,113 | 7/1983 | Sugie et al. | 156/246 |
| 4,572,865 | 2/1986 | Gluck et al. | 425/817 C |
| 4,590,030 | 5/1986 | Gillner et al. | 425/205 |
| 4,595,440 | 6/1986 | Lynch | 156/246 |
| 4,693,858 | 9/1987 | Volke | 264/102 |
| 4,698,110 | 10/1987 | Vassiliou | 156/246 |

Primary Examiner—David Simmons
Assistant Examiner—Louis Falasco
Attorney, Agent, or Firm—Wenderoth, Lind & Ponack

[57] ABSTRACT

An apparatus for manufacturing silicone gel sheet comprising a material supplying means which supplies kneaded silicone gel material to a nozzle, a nozzle which admits to flow silicone gel material supplied from said material supplying means and is provided with a discharging port which is open to be narrow and long, at least one movable receiving means which receives a sheet-formed strip made of silicone gel material discharged from said nozzle and moves in accordance with the discharging speed of the sheet-formed strip, and a heating section for heating and gelling the sheet-formed strip made of silicone gel material on said movable receiving means.

2 Claims, 3 Drawing Sheets

APPARATUS FOR MANUFACTURING SILICONE GEL SHEET

BACKGROUND OF THE INVENTION

The present invention relates to an apparatus to be used to manufacture gelled thin sheet made of silicone as material.

Silicone gel is an extremely useful material as a buffer material or a shock absorbing material. Silicone gel to be used for such application has, in most cases, a penetration value of approximately 50 to 200 measured according to JIS (Japanese Industrial Standard) K 2530-1976-(50 g load) and a small thickness.

In the conventional method for manufacturing a thin silicone gel sheet material as described above, silicone material such as, for example, Toray Silicone CY52 (trademark) (manufactured by Toray Silicone Kabushiki Kaisha) has been kneaded, transferred into a tray type container, uniformly leveled with a spatula type plate used by hand, and heated with a flat holding plate made of metal or glass placed on the silicone material extended in the tray type container.

However, said kneaded silicone gel material provides the property that it has the viscosity of 1000 to 1200CP when it does not contain other substances and that of 5000 to 10,000CP when it is kneaded with fine hollow particles and the pot life at a normal temperature is short and therefore there has been a problem that the work of filling the tray type container with this silicone material and leveling it in the container has been extremely troublesome and unsuitable for volume production.

SUMMARY OF THE INVENTION

An object of the present invention is to provide an apparatus capable of automatically processing silicone gel material with high viscosity without manual operation and thus manufacturing a silicone gel sheet with the specified thickness.

To materialize this object, the apparatus in accordance with the present invention is provided with a device having a material supplying means for supplying kneaded silicone gel material such as, for example, a storing means such as a hopper into which the material is charged and a pressurized feeding means for feeding under pressure silicone gel material taken out from the hopper, a nozzle for discharging silicone gel material supplied from said material supplying means such as, for example, a nozzle having a narrow and long discharging port which is connected to said pressurized feeding means and horizontally open to discharge silicone gel material fed under pressure from said pressurized feeding means in the specified thickness and width, at least one movable receiving means which receives the sheet-formed strip made of silicone gel material discharged from said nozzle and moves keeping pace with the discharging speed of the sheet-formed strip such as, for example, a tray type container provided on the belt conveyor, and a heating section for heating the sheet-formed strip on said movable receiving means and said apparatus is adapted so that the sheet-formed strip made of silicone gel material which is discharged from said nozzle is extended over the movable receiving means along with movement of said movable receiving means and heated by the heating section to gel silicone gel material in the form of sheet.

Another object of the present invention is to provide an apparatus which is adapted so that the thin sheet-formed strip supplied to the movable receiving means is completely free from bubbles.

If silicone gel material of the sheet-formed strip contains bubbles, large bubbles will be included in the finished silicone gel sheet and its uniform shock absorbing performance will be impaired or silicone gel sheet will be partly damaged.

In case of the apparatus in accordance with the present invention, such problem is eliminated by sealing the tank which contains silicone gel material and reducing the internal pressure of the tank to expel bubbles from silicone gel material in the material supplying means, for example, immediately before it is fed into the hopper.

Another further object of the present invention is to provide an apparatus for laminating both sides of the sheet-formed strip supplied from the nozzle to the movable receiving means, that is, the thin silicone gel material with heat-resistant films at its both sides and rolling this laminated thin sheet-formed strip covered with films at its both sides by the rollers before heat treatment. Thus, the silicone gel sheet can be formed to have a uniform thickness.

These upper and lower films should preferably be easily removable from silicone so that they can be replaced with other types of films such as, for example, thermoplastic film, depending on the purpose of use of the silicone gel sheet.

PREFERRED EMBODIMENT OF THE INVENTION

Figure 1:
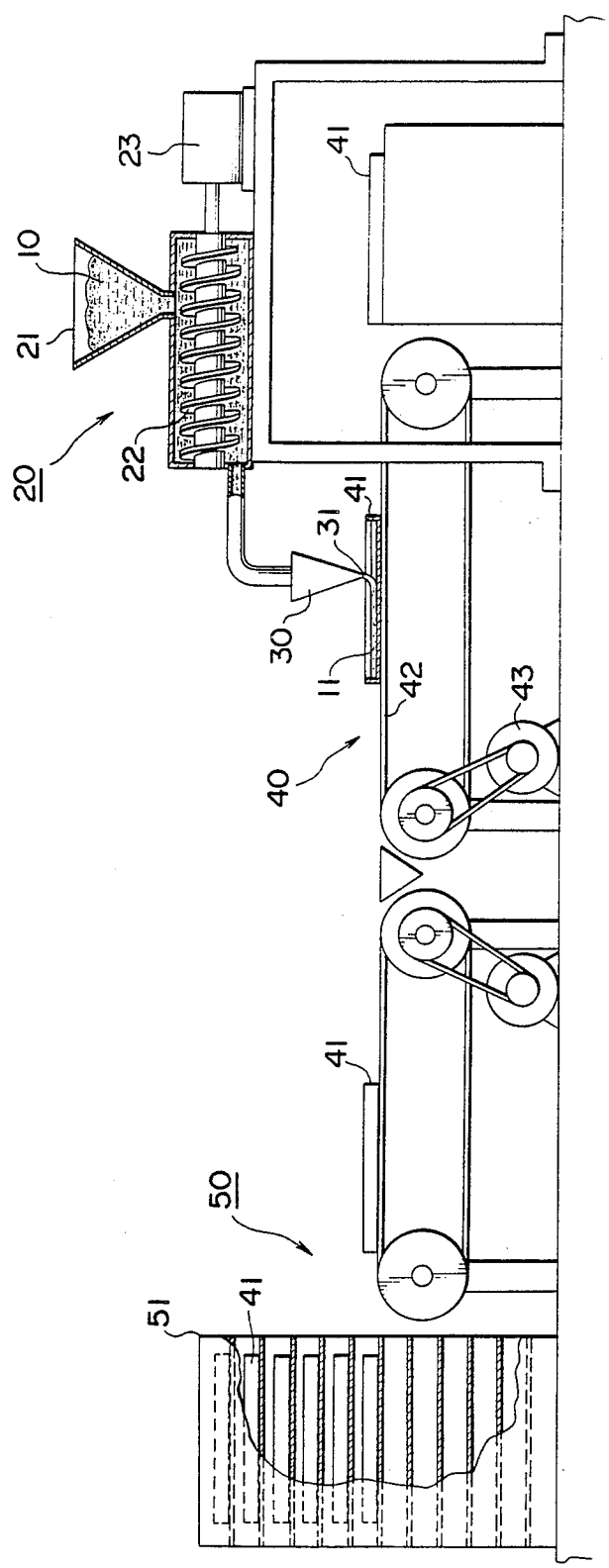
FIG. 1 is a partly cutaway rough side view illustrating the construction of the apparatus in accordance with the present invention.

Referring to FIG. 1 which is a partly cutaway rough side view illustrating the construction of the apparatus in accordance with the present invention, there is shown the material supplying means 20 which supplies silicone gel material 10. This means 20 is provided with the hopper 21 which is the storing means and the screw conveyor 22 shown as the pressurized feeding means. This screw conveyor 22 is connected to the nozzle 30 to which silicone gel material 10 is supplied from the screw conveyor 22. The transfer unit 40 and the heating section combined with this transfer unit 40 are shown below said nozzle 30.

Said hopper 21 can be otherwise constructed if it can store silicone gel material 10. In the embodiment, the hopper is flared and opened upwardly to admit kneaded silicone gel material, which is supplied down to the screw conveyor 22 at a lower position by its own weight.

The screw conveyor 22 supplies under the specified pressure silicone gel material 10 supplied from the hopper 21 to the nozzle 30 and silicone gel material 10 is extruded from the nozzle 30 by virtue of this pressure.

The material supplying pressure and speed of the screw conveyor 22 are set by the variable speed drive motor 23.

The discharging port 31 of said nozzle 30 is adapted so that it is open narrow and long right above the movable receiving means 41 provided on said transfer unit 40 in the direction of width, that is, the direction from the surface of the paper with the figure shown to the rear of the paper as the horizontal direction and the opening size in the direction of thickness at right angles to that of width, that is, the transversal direction in FIG. 1, can be freely set by, for example, replacing the nozzle tip, and the thickness of silicone gel material 10 is controlled.

Silicone gel material 10 discharged from this discharging port 31 is formed in layers on the movable receiving means 41 as a thin sheet-formed strip 11 which has the thickness determined by the opening size of the discharging port 31.

Said movable receiving means 41 is formed by the tray type container which is remountably provided on the belt conveyor 42. However, depending on the case, the upper surface of the belt conveyor 42 can be made of steel to directly serve as the movable receiving means.

Said movable receiving means 41 is arranged so that the direction of its width, that is, the direction orthogonally intersecting the forwarding direction, matches to the direction of width of the discharging port 31 of said nozzle 30 and accordingly the sheet-formed strip 11 made of silicone gel material 10 which is discharged from the nozzle 30 is loaded on the movable receiving means 41 which moves in the same direction as the discharging direction and is extended on the movable receiving means 41 which moves at the speed kept pace with the discharging speed of silicone gel material 10.

Said movable receiving means 41 is driven by the variable speed drive 43 which is controlled in relation to the drive motor 23 for said screw conveyor 22.

Said heating section 50 in said embodiment is equipped with the multi-staged heating furnace 51 which is constructed so that, for example, a number of tray type containers 41 are stacked to separately heat the tray container type movable receiving means 41 unloaded from the belt conveyor 42. If the upper surface of the belt conveyor 42 is directly used as the movable receiving means as described above, the heating section through which the belt conveyor 42 passes during running is provided and a means for taking up gelled silicone gel sheet after heat treatment is provided following said heating section.

Figure 2:
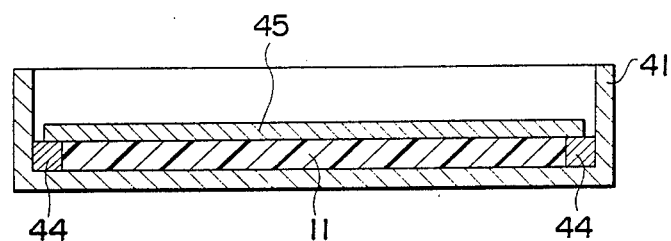
FIG. 2 is a vertical front view of the tray type container as the movable receiving means for use in the embodiment shown in FIG. 1.
Figure 4:
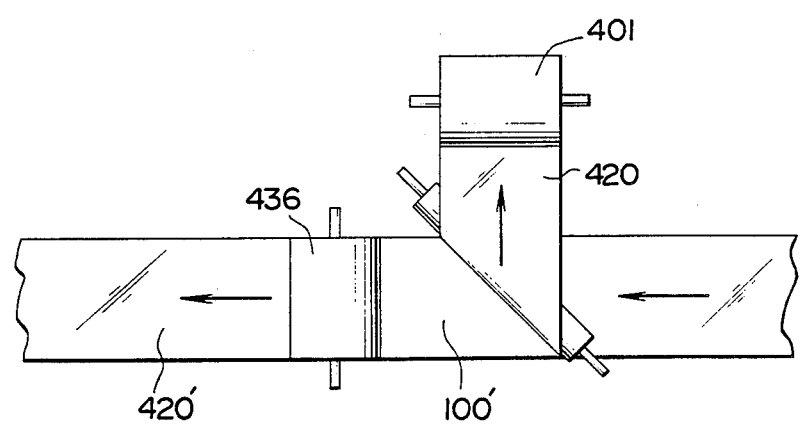
FIG. 4 is a plan view showing the embodiment of the film replacing mechanism to be used in the apparatus shown in FIG. 3.

The thickness and the width of said silicone gel sheet can be freely set by replacing the discharging tip of said nozzle 30 or forming the nozzle 30 itself so that the opening width and thickness of the discharging port 31 can be adjusted. For more strictly setting the thickness of silicone gel sheet, liners 44 and 44' with the specified thickness can be provided at both sides of the tray type movable receiving means 41 as shown in FIG. 2 to feed sheet-formed strip 11 made of silicone gel material between these liners 44 and 44' and a smoothed flat holding plate 45 can be placed on this sheet-formed strip 11 to make the thickness of sheet-formed strip 11 uniform by its own weight or applying a certain specified pressure with a separate means.

Hereupon, it is preferable to apply in advance a parting agent such as, for example, the silicone oil (tradename: SH-3749) which is manufactured by Toray Silicone Kabushiki Kaisha, for avoiding adhesion of silicone gel material 10 to said movable receiving means 41 and said holding plate 45. Thus, the gelled silicone gel sheet can be easily taken off from the movable receiving means 41.

Figure 3:
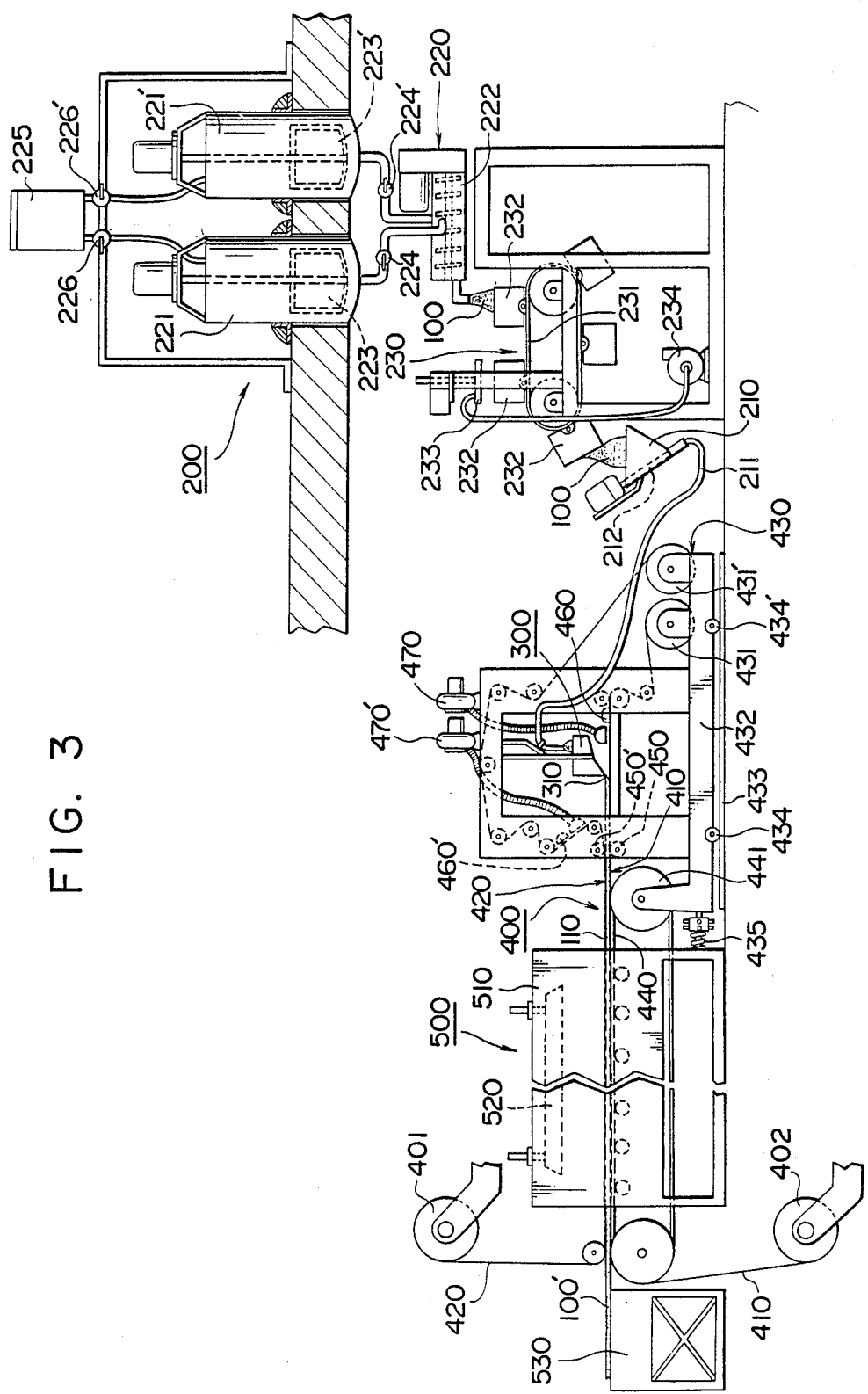
FIG. 3 is a rough side view showing another embodiment of the apparatus in accordance with the present invention.

Referring to FIG. 3, there is shown another embodiment of the apparatus in accordance with the present invention.

In this embodiment, bubbles are removed from silicone gel material 100 in the material supplying means before it is supplied to the hopper and the sheet-formed strip 110 made of silicone gel material is rolled by a pair of upper and lower side rollers.

In addition, in this embodiment, the sheet-formed strip made of silicone gel material is laminated with films at its both sides and the lower side film is extended over the belt conveyor as the movable receiving means.

In this embodiment, a silicone material made up by mixing fine hollow particles such as, for example, Fillite (trademark) or Expancel (trademark) manufactured by Nippon Fillite Kabushiki Kaisha in a two-liquid kneaded type silicone material such as, for example, Toray Silicone CF5027 (trademark) or Toray Silicone CY52 manufactured by Toray Silicone Kabushiki Kaisha or KE-1051 (trademark) manufactured by Shinetsu Kagaku Kogyo Kabushiki Kaisha is used as silicone gel material. Such silicone gel is disclosed by the U.S. Patent Application Ser. No. 814726.

The apparatus of this embodiment comprises the material supplying means 200, nozzle 300, transfer unit 400 and heating section 500. Said material supplying means 200 is provided with the hopper 210, kneading unit 220 for kneading and treating silicone gel material 100 and bubble removing unit 230 following the kneading unit 220.

Said kneading unit 220 has a pair of kneading tanks 221 and 221' for separately storing liquids A and B and the kneading feeder 222 such as the kneader pump which is provided at the lower parts of these kneading tanks 221 and 221'.

Liquids A and B for silicone gel material 100 are respectively mixed with said fine hollow particles in individual tanks 221 and 221'.

For this purpose, rotary vanes 223 and 223' are respectively provided inside the tanks 221 and 221' to individually stir liquid A and liquid B to mix it with fine hollow particles.

Tanks 221 and 221' are respectively provided with valves 224 and 224', which will be opened to supply liquids A and B to the feeder 222. In other words, the gelling phenomenon during kneading can be prevented by mixing fine hollow particles in liquids A and B in different tanks 221 and 221'.

These tanks 221 and 221' are installed on the upper floor of the plant and utilizes the gravity as a supplementary force for pressurized supplying of liquids A and B to the feeder 222 located on the lower floor.

For mixing said fine hollow particles, kneading tanks 221 and 221' are provided with the tank 225 for supplying fine hollow particles from which a required quantity of fine hollow particles is supplied to a pair of kneading tanks 221 and 221' through valves 226 and 226', respectively.

The feeder 222 kneads liquids A and B which have been mixed with fine hollow particles into a gelled solidifiable state of material and feeds it to the debubbling unit 230 which removes air bubbles from the material 100.

This debubbling unit 230 is constructed with the endless belt 231 which circulates in a vertical direction and equipped with a plurality of debubbling tanks 232 whereby the debubbling tanks 232 intermittently move along with circulatory movement of the endless belt 231 and stop in sequence at a position where silicone gel material 100 is supplied from the feeder 222, the debubbling position and a position where silicone gel material 100 is supplied to the hopper 210. At the debubbling position for this tank 232 is provided the cover 233 which lowers from the upper position to close the opening of the tank 232 when the tank 232 is stopped. The cover 233 is provided with the pressure reducing means such as, for example, the vacuum pump 234 etc. to reduce the internal pressure of the tank 232 tightly closed by the cover 233.

Accordingly, air bubbles contained in silicone gel material 100 in the tank 232 during the kneading process will be removed by reduction of the internal pressure of the tank 232.

The tank 232 turns down to a position above the hopper 210 after air bubbles have been removed and stops at this position with its opening faced down.

Accordingly silicone gel material 100 in the tank 232 flows out from the tank 232 into the hopper 210.

At the outlet side of the hopper 210 is provided the pressurized feeding means 212 such as, for example, the screw for feeding silicone gel material 100 under pressure whereby silicone gel material 100 is pushed out by this pressurized feeding means 212 onto the material supplying passage. Said passage, for example, a flexible hose 211, preferably a transparent hose made of polyvinyl chloride, is connected between the output of the hopper 210 and the nozzle 300 and this flexible hose 211 is freely reconnectable to the hopper for cleaning after the work has been finished.

The pressurized feeding screw 212 is provided inside the hopper 210 and silicone gel material 100 in the hopper 210 is pushed out toward the nozzle 300.

In case that, for example, debubbling is carried out inside the kneading tanks 221 and 221', the hopper 210 can be omitted from the material supplying means 200 since the kneading feeder 222 can be directly connected to the nozzle 300 to supply silicone gel material 100 to the nozzle 300.

The sheet-formed strip 110 discharged from this nozzle 300 is laminated with films 410 and 420 at its both sides immediately after it has been discharged.

This nozzle 300 is made so that silicone gel material 100 inside the nozzle is discharged out by its own weight and, in this embodiment, accordingly the screw conveyor as the pressurized feeding means is not employed.

The transfer unit 400 is provided with the film supplying unit 430 and a pair of reels 431 and 431' of this film supplying unit 430 are wound with the upper side film 420 and the lower side film 410 serving as the movable receiving means. The lower side film 410 is extended horizontally below the discharging port 310 so that the lower side film 410 comes in contact with the sheet-formed strip 110 and the upper side film 420 is supplied from a position above the discharging port 310 so that the upper side film 420 is laminated onto the upper surface of the sheet-formed strip 110.

The sheet-formed strip 110 thus covered with films 410 and 420 at its both sides is horizontally transferred by the carrying means such as, for example, the belt conveyor 440 etc. and guided to the heating section 500.

The sheet-formed strip 110 is rolled in the specified thickness by a pair of upper and lower side rollers 450 and 450' before it reaches the heating section 500 during transportation. Though the rollers 450 and 450' also serve the feeding-out rollers in the embodiment, the embodiment is not restricted to this construction.

Said films 410 and 420 are preferably set so that they can be removed when the sheet-formed strip 110 is taken out as the silicone gel sheet. Thus, films 410 and 420 can be removed from the product silicone gel sheet and the covering films conforming to the use of the silicone gel sheet can be instead laminated onto the silicone gel sheet.

In the embodiment, a pair of recovery wind-up reels 401 and 402 which are driven by the means (not shown) are provided at the end part of the heating section 500 to remove and take up films 410 and 420 from the sheet-formed strip 110, and these reels 432 and 402 may be used as the supplying side reels 431 and 431'.

To ensure easy removal of films 410 and 420 from the silicone gel sheet, the parting agent is applied to films 410 and 420 by an applying means such as, for example, the felt brushes 460 and 460' before they are laminated onto the sheet-formed strip 110 and dried by the fans 470 and 470' after it has been applied.

The sheet-formed strip 110 rolled by the rollers 450 and 450' is guided into the heating tunnel 510 of the heating section 500 by the belt conveyor 440. Inside this heating tunnel 510 is provided the heating means such as, for example, the far infrared heater 520 and the gelling of the sheet-formed strip 110 is completed while it passes through this heating tunnel 510.

Said belt conveyor 440 is provided at the heating section side of the rollers 450 and 450' in the embodiment.

The roll 441 at the starting end of this belt conveyor 440 is supported by the framework 432 of said film supplying unit 430 and the framework 432 is loaded on the rail 433 with wheels 434 and 434'.

Said framework 432 is tensioned by the spring mechanism 435 with said heating tunnel 510 as the fulcrum and the belt conveyor 440 is also tensioned by the repulsive force of this spring.

The silicone gel sheet 110' whose gelling has been completed is taken up at the taking-up section 530 located beside the heating tunnel 510. However, the silicone gel sheet cannot be actually used as having been taken up and generally it is sealed into a covering member such as a covering film, and it is used as the so-called "gel-filled pad".

If said upper and lower films 410 and 420 are suitable as the covering material to an application environment where the gel-filled pad is to be used, the films 410 and 420 can be adhered to make the gel-filled pad. However, since the application environment where the gel-filled pad is used varies differently, films 410 and 420 which are inexpensive, non-massive and heat resistant should be used when manufacturing the silicone gel sheet and another type of covering material which meets the application environment should be replaced with films 410 and 420 for use on the product silicone gel sheet 100'.

For example, an extremely thin polyester film is suitable as films 410 and 420 to be used only when manufacturing the silicone gel sheet, and polyvinyl chloride film, polyurethane film or a copolymerized film of polyurethane and polyvinyl chloride is favorable as the covering material for the product gel-filled pad.

For replacing the films, a continuous silicone gel sheet 100' is cut in appropriate sizes, the films applied to upper and lower sides of the cut silicone gel sheets are removed and the films suitable to the application environment are adhered again to the upper and lower surfaces of the silicone gel sheet as the covering material instead of the previously used films.

If the films are replaced on the continuous silicone gel sheet, the film 420 (410) can be wound up by the wind-up reel 401 (402) to remove it from the silicone gel sheet 100' and new covering films 420' (one of which is not shown) unwound from the film supplying reel 436 can be immediately adhered onto the upper and lower surface of the silicone gel sheet 100'.

The present invention is not limited to the abovementioned embodiment and is available in various variations within the range of the claims and spirit of the present invention.

What is claimed is:

1. An apparatus for manufacturing a silicone gel sheet, comprising:
    a transfer means having an upper receiving surface;
    means for moving said transfer means so as to move said upper surface in a direction at a predetermined speed;
    supplying means for supplying a thin heat resistant film to said upper receiving surface so as to leave an upper surface of said film exposed;
    applying means for applying a parting agent to said upper surface of said film;
    a nozzle spaced along said transfer means from said applying means in the direction of movement of said transfer means, said nozzle having a long narrow discharging port orthogonally intersecting the direction of forward movement of said receiving means for supplying silicone gel material as a sheet-formed strip onto said film on said transfer means through said discharging port;
    a material supplying means for supplying silicone gel material to said nozzle, said material supplying means having a hopper connected to said nozzle and a pressurized feeding means connected to said hopper, a bubble removing means connected to said hopper for removing bubbles from the silicone gel material being supplied to said hopper, a feeder connected to said bubbles removing means for kneading and feeding silicone gel material under pressure to said bubble removing means, two kneading tanks connected to said feeder and each having mixing means therein, the first tank being for supplying the first of two liquids for preparing a two-liquid kneaded type of silicone gel material and the second tank for supplying the second of the two liquids, and at least one further tank connected to said two kneading tanks for supplying fine hollow particles to said two kneading tanks;
    a heating section spaced along said transfer means from said nozzle for heating the sheet-formed strip on said transfer means for gelling it; and
    means on the end of said heating section toward which said transfer means is moving for peeling said film from the under side of the gelled sheet-formed strip.

2. An apparatus as claimed in claim 1 in which said nozzle has a discharge port and said nozzle comprises means for varying the dimension of the discharging port of said nozzle in the direction of movement of said transfer means for varying and adjusting the thickness of said sheet-formed strip.

* * * * *